Feb. 22, 1966  R. C. ZELLER  3,235,948
METHOD OF MAKING FLANGED HUB MEMBERS
Filed Feb. 7, 1962
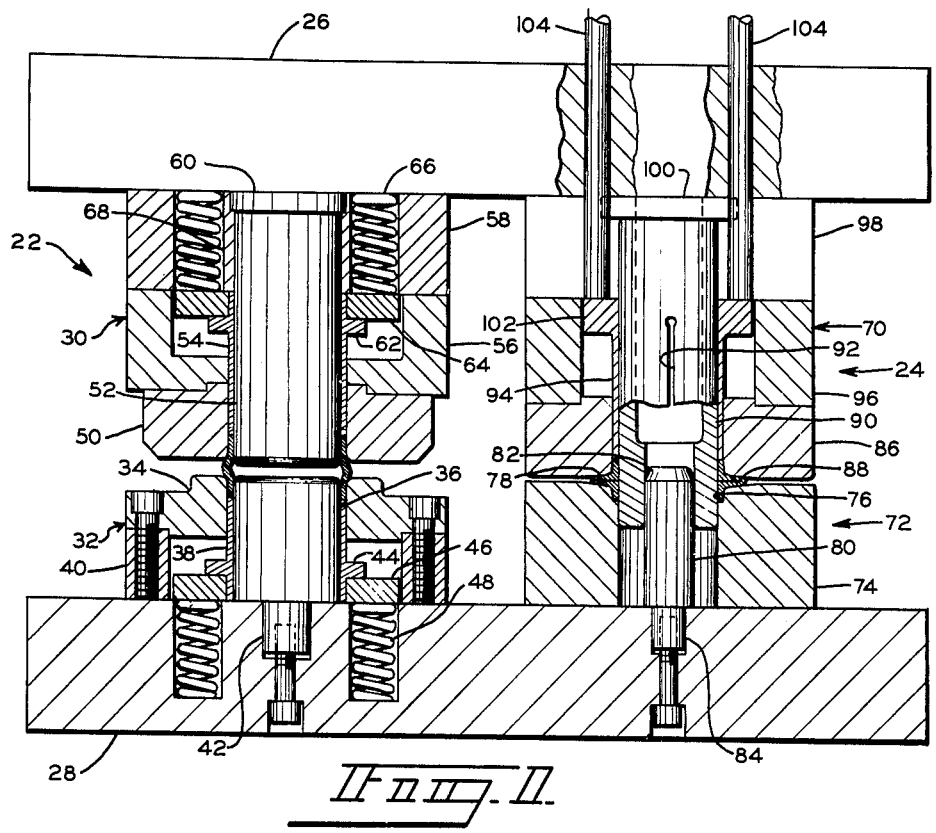
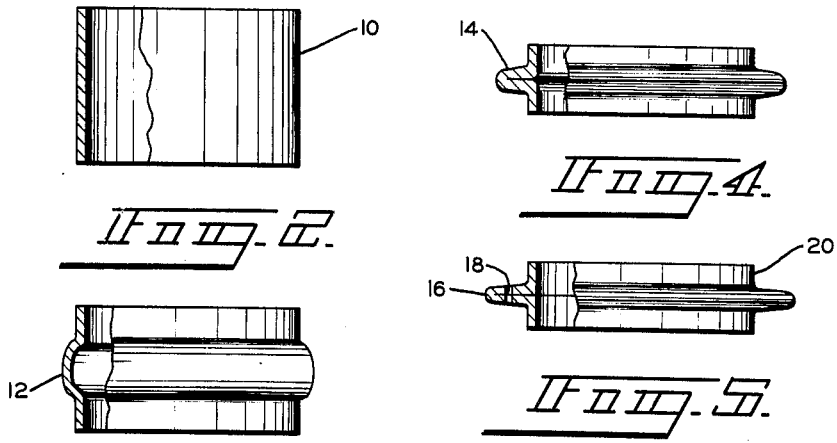
INVENTOR.
ROBERT C. ZELLER
BY
ATTORNEYS 3,235,948
METHOD OF MAKING FLANGED
HUB MEMBERS
Robert C. Zeller, Defiance, Ohio, assignor to The Zeller Corporation, Defiance, Ohio, a corporation of Ohio
Filed Feb. 7, 1962, Ser. No. 171,645
2 Claims. (Cl. 29—159.3)

This invention relates to a method of making a flanged hub member and more particularly to a method of making a spoke flange for a hub of a bicycle wheel.

Heretofore, flanged hub members of the general class with which the invention is concerned usually have been made by machining a cylindrical piece of stock. Machining methods heretofore employed are time consuming and result in relatively low production rates, and a substantial waste of metal which must be cut away from the blank.

The present invention relates to a new method for making an annular flange from a metal cylinder which eliminates the usual machining, etc., and enables the flange to be produced with but a few strokes of a conventional drawing press. The new method is not only fast but is also inexpensive and capable of producing parts held to close tolerances. While the method relates specifically to the making of spoke flanges for bicycle wheel hubs, it can be used equally well for producing annular flanged members for other purposes.

It is, therefore, a principal object of the invention to provide an improved method for making annular flanged members from tubular blanks.

Another object of the invention is to provide an improved method for making spoke flanges for bicycle wheel hubs.

Other objects and advantages of the invention will be apparent from the following detailed description of a preferred embodiment thereof, reference being made to the accompanying drawings, in which:

FIG. 1 is a vertical cross sectional view of apparatus for carrying out the method of the invention;

FIGS. 2, 3, 4 and 5 are side elevational views with a part broken away showing the progressive forming steps from the tubular blank to the finished spoke flange member.

The overall stamping method according to the invention will be discussed before one suitable and specific apparatus for carrying out the steps of the method is described. Accordingly, a cylindrical metal blank 10, as shown in FIG. 2, is first provided, this blank being made by any suitable means. The blank 10 is compressed at a first stamping station while all but a narrow central portion is restrained from movement so that this central portion can move only outwardly to form a bulge 12, as shown in FIG. 3. The blank with the bulge 12 therein is then moved to a second stamping station in which the blank is compressed further to form a rounded ridge 14, as shown in FIG. 4. After this, the blank with the ridge 14 formed thereon is passed through a coining station in which the rounded ridge 14 is flattened and spread to increase the width and to decrease the thickness thereof, and thereby form the flange 16 shown in FIG. 5. Holes 18 for the reception of spoke wires are next formed in the flange 16 by a piercing operation or by any other suitable technique, thereby to form a completed spoke flange member indicated at 20, two of which are then assembled with a bicycle hub. In a preferred form, this is accomplished by a very tight friction fit, but the friction fit can be supplemented or supplanted by welding, bolting, brazing, etc.

Referring now more particularly to FIG. 1, the left-hand side shows a first stamping station indicated at 22 and the right-hand side shows a coining station indicated at 24. Both of the stations 22 and 24 operate together, along with other stations if desired, by means of an upper slide 26 and a lower bed 28 which constitute portions of a conventional heavy duty punch press. The first die station 22 includes an upper die section 30 and a lower die section 32. The lower die section 32 includes a lower die ring 34, the diameter of which is similar to the outer diameter of the blank 10 to prevent it from spreading. Within the die ring 34 is an inner die core 36 which is spaced from the ring 34 by a distance substantially equal to the thickness of the metal forming the blank 10. A tubular stop member 38 is located between lower portions of the core 36 and the ring 34 and limits downward movement of the blank 10.

The die ring 34 is supported on the press bed or bolster 28 through legs 40 and the die core 36 is supported and positioned on the bed 28 by a projection 42. Finally, the tubular stop member 38 is resiliently supported with respect to the bed 28 through a shoulder 44 engaged by a knock out ring 46 urged upwardly by springs 48. Upward movement of the tubular stop member 38 is limited by the restraining ring 34 when contacted by the flange 44.

The upper die section 30 includes a die ring 50 having an inner diameter similar to that of the lower die ring 34. A central die core member 52 projects within the die ring 50 and is spaced therefrom by approximately the thickness of the metal in the blank 10 so that the diameter of the cylindrical core member 52 is equal to that of the core member 36. An upper tubular stop member 54 is located partially between the ring 50 and the core member 52, being of substantially the same thickness as the metal of the blank 10. The stop member 54 limits upward movement of the blank 10 in the same manner as the lower stop member 38.

The ring 50 is mounted on the press slide 26 through suitable spacer blocks 56 and 58. The die core member 52 is supported by the press slide 26 in any suitable manner. The tubular stop member 54 is resiliently supported by the slide 26 through a flange 62 engaged by a knock out ring 64 which is urged downwardly by springs 66. Upward movement of the tubular member 54 is limited by a stop cylinder 68 which contacts the rear of the tubular member 54 and downward movement of the member is limited by the spacer block 56 which contacts the flange 62.

In operation, the tubular blank 10 is positioned between the die sections 30 and 32 when the slide 26 is in its raised position (not shown). When the slide 26 is raised the springs 48 and 66 urge the tubular stop members 38 and 54 toward one another with the flanges 44 and 62 now against the die ring 34 and the spacer block 56, respectively. In this position, the ends of the stop members 38 and 54 lie just below the ends of the die core members 36 and 52 and the adjacent surfaces of the die rings 34 and 50. With the blank 10 now in contact with the upper end of the lower tubular stop member 38, as the platens 26 and 28 are then moved together, the blank 10 forces the stop members 38 and 54 to retract until the lower end of the lower stop member 38 contacts the surface of the bed 28 and until the upper end of the stop member 54 contacts the stop cylinder 68. When the stop members 38 and 54 reach the limit of their movement, the adjacent ends of the die core members 36 and 52 are just slightly farther apart than is shown in FIG. 1 which is also true of the adjacent surfaces of the restraining rings 34 and 50. Further movement of the press slide 26 then necessitates buckling of the blank 10. The end portions of the blank cannot move, of course, due to the restraining effect of the inner and outer die members and the upper and lower stop members 38 and 54. This means that the intermediate, unrestricted portion of the blank 10 must move. This portion cannot move inwardly since to do so would place it under greater compression and thereby restrain such movement. Hence, it must bulge outwardly and does so to form the bulge 12, as shown in FIG. 3.

The blank with the bulge 12 formed therein is then moved to a die station similar to the station 22 which may also be operated by the same platens 26 and 28 to form the rounded ridge 14 shown in FIG. 4. Since the die station for this operation is substantially similar to the station 22, it is not illustrated or described.

It will be understood that in many instances, depending upon a number of factors such as the thickness of the metal of the blank 10, the type of metal, the heat-treatment thereof, and the desired size of the ridge 14, it will be possible to produce the ridge 14 on the blank 10 by a single die station.

When the ridge 14 has been formed, the blank is removed and subjected to a subsequent coining operation at the station 24. The coining station 24 includes an upper die section 70 and a lower die section 72. The lower die section 72 includes a die ring 74 which has a recess 76 to receive the lower portion of the blank 10 and a tapered portion 78 to receive the ridge 14 of the blank. Positioned within and spaced from the die ring 74 is a spreading mandrel 80 having a tapered upper end 82.

The die ring 74 can be supported on the press bolster 28 through any suitable means and the mandrel 80 is supported by and positioned on the bolster through a projection 84. The function of the mandrel 80 will be discussed in more detail subsequently.

The upper die section 70 includes a coining die ring 86 which receives an upper portion of the blank and has a tapered portion 88 which acts to coin the rounded ridge 14 into its desired final form. Extending through the coining ring 86 is a core member 90 spaced from the coining ring 86 by approximately the thickness of the metal of the blank 10. The core 90 is split into four quadrants by slots 92 so that the core 90 can be spread to some extent. Normally, the diameter of the core 90 is slightly less than that of the blank 10 so that it can be initially inserted thereinto rather easily. After the core has entered the blank, it is spread by cooperation of the stationary mandrel 80 as the core moves downwardly over the tapered end 82 thereof. The mandrel thereby is forced against the inner surface of the blank and prevents the possibility of any inward movement thereof. Between the core member 90 and the coining ring 86 is a tubular stop member 94 which limits upward movement of the upper end of the blank and which may later serve as a knock out during the subsequent upstroke of the press.

The coining ring 86 is supported by the press slide 26 through spacing rings 96 and 98 and the core 90 is supported by the slide 26 through an enlarged portion 100. The tubular stop member 94, whose upper position is determined by a flange 102 thereof contacting the spacer ring 98, is connected to a pair of knock out pins 104 which control downward movement of the tubular member. The knock out pins 104 move the tubular member 94 downwardly after the coining operation to separate the blank from the die ring 86 and the core member 90.

In operation, the blank with the initially formed rounded ridge 14 is placed in the die 76 with the rounded ridge 14 on the tapered portion 78 when the slide 26 and bolster 28 are separated. As the press slide 26 moves downwardly, the lower end of the core member 90 enters the blank and then begins to spread as it moves downwardly over the tapered end 82 of the mandrel 80. This forces the lower end of the core member outwardly to hold the inner diameter of the blank to close dimensions and maintain such dimensions during the coining operation. As downward movement of the slide 26 continues, the tapered portion 88 of the upper coining ring 86 moves into contact with the rounded ridge 14 thereby forcing the ridge 14 outwardly between the tapered portions 78 and 88, thereby increasing the width and decreasing the thickness thereof to produce the flange 16. The inner contiguous surfaces of the flange 16 tend to weld together during the coining operation under the tremendous pressures produced which adds to the strength of the resulting coined flange.

After the coining operation, and the slide 26 moves upwardly, the knock out pins 104 push the tubular member 94 downwardly to force the blank downwardly and separate it from the coining ring 86 and the core member 90. When this is completed, the tubular member 94 is moved to its upper position with the flange 102 in contact with the spacer ring 98 by means of the pins 104. Another coining operation can then be commenced.

The spoke holes 18 in the flange 16 can be made in any suitable manner and can be pierced by well known techniques. The final flange member 20 is then complete and is ready to be employed in the final product. In the case of a bicycle wheel hub, two of the flange members 20 are assembled with the hub by being attached to end portions thereof. This can be accomplished by a friction fit or by welding, etc., as previously discussed. Of course, the blank can be of any width so as to extend a substantial distance or a very short distance on each side of the flange 16. It is even possible that the portion of the blank on either or both sides of the flange 16 can constitute the hub itself, where lightweight hubs are required.

Various modifications of the above described embodiment of the invention will be apparent to those skilled in the art, and it is to be understood that such modifications can be made without departing from the scope of the invention, if they are within the spirit and the tenor of the accompanying claims.

I claim:

1. A method of forming a flanged bicycle hub which comprises providing a metal cylindrical blank, compressing said blank at its ends at a first stamping station while restricting all but a narrow intermediate portion thereof to form a bulge on the cylindrical blank, further compressing the cylindrical blank in a second die station while restraining substantially the same portions as before to cause said bulge to form a rounded ridge with the inner surfaces of the ridge portion in contact with one another, inserting an expandable mandrel in said cylindrical blank, urging said expandable mandrel outwardly against the rounded ridge portion of said cylindrical blank, flattening said ridge to form it into a flange and to cause the inner surfaces of the flange to at least partially weld to one another, and forming holes in the flange.

2. A method according to claim 1 characterized by assembling two of the resulting flange members on opposite ends of a bicycle hub member.

References Cited by the Examiner
UNITED STATES PATENTS

| | | | |
|---|---|---|---|
| 510,519 | 12/1893 | Ragoucy | 29—159.3 |
| 606,046 | 6/1898 | Chillingworth | 29—159.3 |
| 616,764 | 12/1898 | Bourke | 29—159.3 |
| 1,928,911 | 10/1933 | Riemenschneider et al. | 29—159.3 |
| 2,763,057 | 9/1956 | Clair | 29—470.1 |
| 2,894,322 | 7/1959 | Clair | 29—470.1 |

JOHN F. CAMPBELL, *Primary Examiner.*

THOMAS H. EAGER, *Examiner.*

R. D. GREFE, *Assistant Examiner.*